Figure 1:
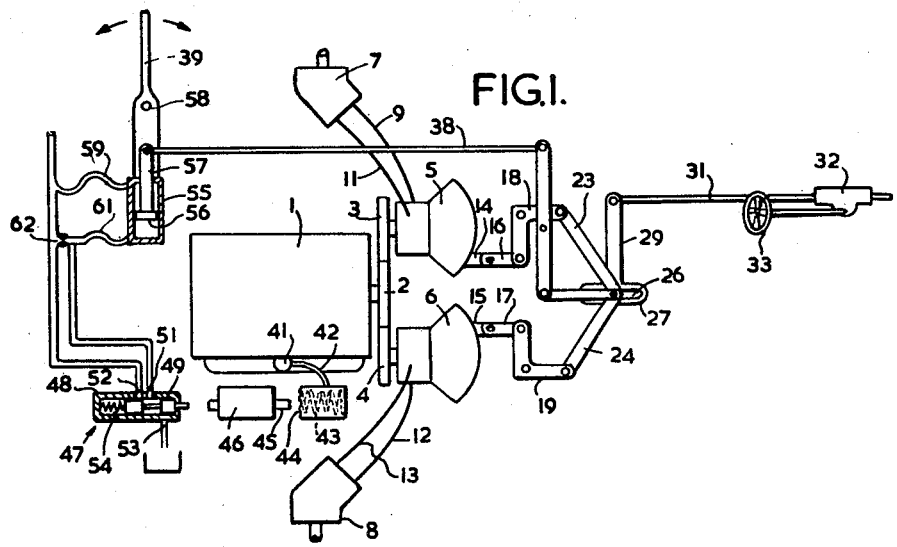

Dec. 15, 1964   O. THOMA   3,161,245
VEHICLE PROPULSION

Filed June 19, 1961   3 Sheets-Sheet 1

INVENTOR
Oswald Thoma

BY Reynolds & Christensen
ATTORNEYS

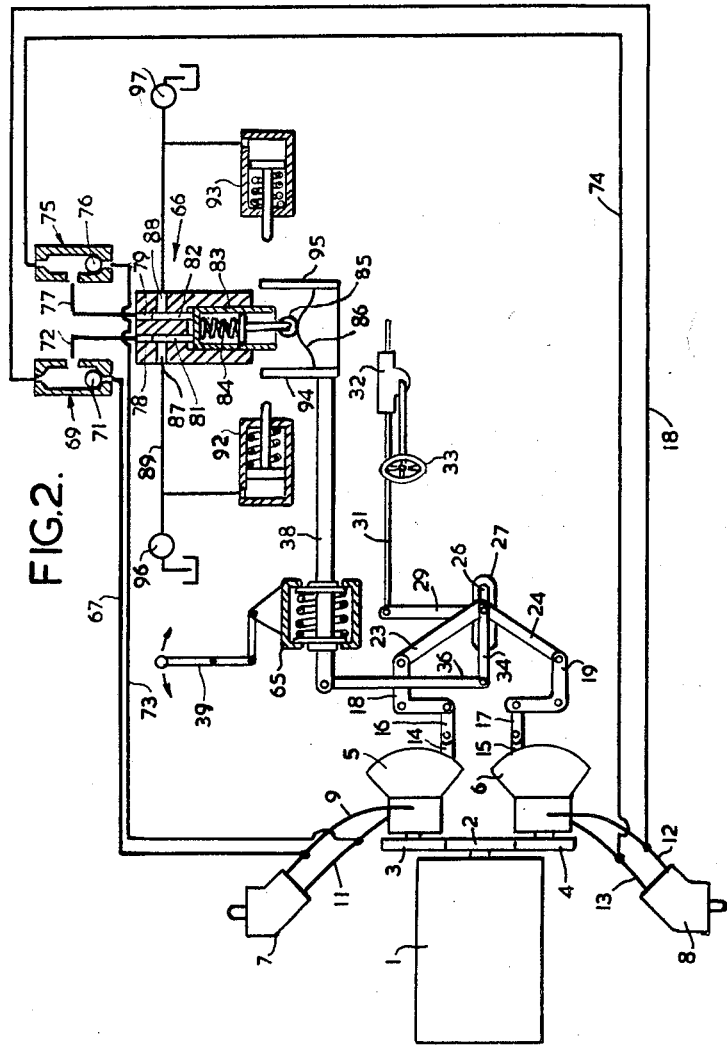

Dec. 15, 1964    O. THOMA    3,161,245
VEHICLE PROPULSION
Filed June 19, 1961    3 Sheets-Sheet 3
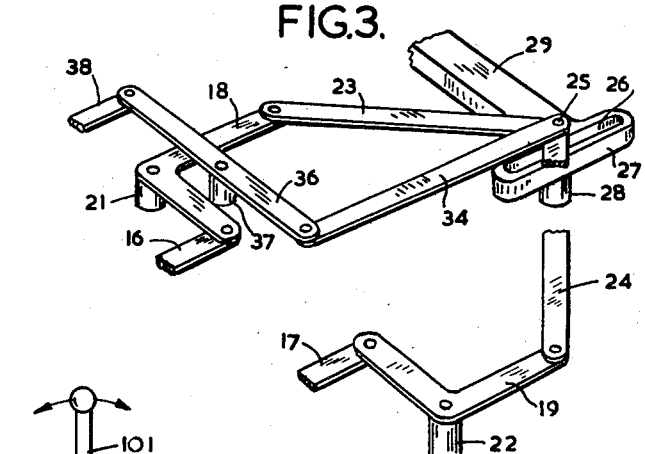
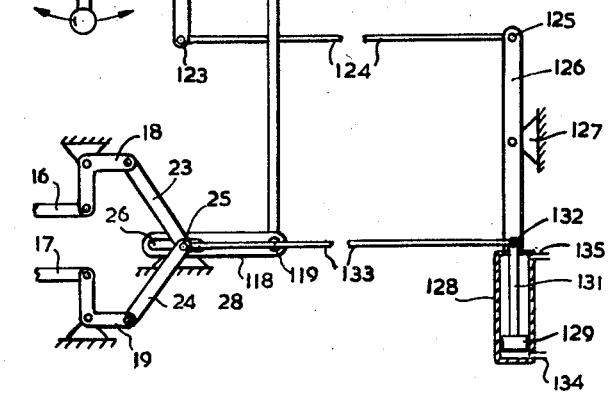
INVENTOR
Oswald Thoma
BY Reynolds & Christensen
ATTORNEYS

United States Patent Office 3,161,245
Patented Dec. 15, 1964

3,161,245
VEHICLE PROPULSION
Oswald Thoma, Grunwald uber Munich, Germany, assignor to Dowty Hydraulic Units Limited, Tewkesbury, England
Filed June 19, 1961, Ser. No. 118,028
Claims priority, application Great Britain, June 21, 1960, 21,769/60
9 Claims. (Cl. 180—6.48)

This invention relates to vehicle propulsion and more particularly to vehicle propulsion means of the kind in which a pair of ground engaging elements spaced transversely of the direction of vehicle movement are driven individually through separate infinitely variable speed ratio transmissions which, in turn, are both driven by a single vehicle engine or other single source of mechanical power. This kind of vehicle propulsion means will be referred to as vehicle propulsion means of the kind referred to. The term "engine" for the purpose of this specification is taken to refer to any mechanical power source for a vehicle.

The infinitely variable speed transmissions and the engine for any vehicle will normally, from the economic viewpoint, be made sufficient only to obtain certain maximum performance characteristics and it will frequently occur during use, particularly if the vehicle is a crawler tractor or a bulldozer, that the engine and transmissions are operated at their maximum performance. The present invention sets out to provide safety means to prevent damage to the engine and/or transmissions which, in particular, will operate without disturbing the steering of the vehicle. It will be appreciated that if a vehicle is being driven at a speed approaching the limit of its performance and if automatic overriding action takes place, the steering should not be affected since, if it were, the possibility of collision or other dangerous result might be present.

In vehicle propulsion of the kind referred to in accordance with the present invention, one or more overload sensing devices are provided responsive to overloading of the engine and/or of the transmissions, and operative on occurrence of such overloading to reduce the selected speed ratio of the transmissions proportionally to the individual speeds of the transmissions selected for propulsion of the vehicle. In this way any curved path of travel on which the vehicle moves will not be affected if the overload sensing device, or devices, takes action to reduce the overload. The overload sensing device of the engine may comprise means operative in conjunction with the engine speed governor and responsive to the fuel flow to the engine selected by the speed governor to give a signal of overloading when the fuel flow to the engine reaches a pre-determined large value. Overloading in the transmission is preferably detected by means sensitive to the torque transmitted and in the case of a hydrostatic transmission such torque responsive means is the actual hydrostatic pressure generated within the transmission itself. Where the transmissions comprises a variable displacement pump driven by the engine and a fixed displacement pump to drive the ground engaging element, the overload sensing means may comprise a spring loaded valve of which the spring loading is adjusted inversely in accordance with the pump displacement. It is preferred that the automatic action to reduce overload should not affect the position of the manual controls, and this may be obtained by arranging that the overload sensing means takes action to reduce overload by reducing an effective leverage from a fulcrum or by compressing a caged spring linkage.

Three examples of the invention will be described with reference to the accompanying drawings in which:

FIGURE 1 is one example of the invention in which means are provided responsive to engine overloading to take overload reducing action, FIGURE 2 is a second example of the invention in which means sensitive to overloading of the transmission are provided to take overload reducing action, FIGURE 3 is a detailed illustration of a control linkage employed in both FIGURES 1 and 2 for adjustment of the variable speed transmissions, and FIGURE 4 is an example employing conventional two lever control as on a crawler tractor.

In FIGURES 1 and 2 an engine 1 drives a gear wheel 2 which meshes with two separate gear wheels, 3 and 4 connected to drive individually a pair of variable displacement hydraulic pumps 5 and 6. Each pump is in connection respectively with a fixed displacement hydraulic motor 7 and 8, which, in turn, are connected to drive the transversely spaced ground engaging elements of the vehicle. These ground engaging elements may, for example, be the tracks of a crawler tractor. The pump 5, is interconnected with its motor 7 by a pair of hydraulic pipelines 9 and 11, whilst the pump 6 is interconnected with motor 8 by means of pipelines 12 and 13. The displacement of pump 5 is adjusted through a control rod 14 movable linearly into and out of the pump 5 whilst the pump 6 is similarly controlled by a control rod 15. Internally of the pumps these control rods operate servo control mechanisms for controlling pump displacement. Control rod 14 is connected by a link 16 to one end of a bell crank lever 18 pivoted at a fixed fulcrum 21. Similarly rod 15 is connected by link 17 to bell crank 19 having fulcrum 22. The opposite ends of these bell crank levers are connected to inclined links 23 and 24, which are connected together at their opposite ends by a pivot pin 25. The pivot pin 25 is arranged for sliding movement within the slot 26 of a slotted lever 27 which itself is mounted on a fixed fulcrum 28. An extension 29 from the slotted lever extends to a link 31 which is longitudinally adjustable by means of rack and pinion gearing 32 in turn operated by steering wheel or regulator 33 of the vehicle. A link 34 extends from the pivot 25 for connection to a lever 36 mounted at a fixed fulcrum 37. The opposite end of lever 36 is connected to a link 38 which is adjustable by means of the manual speed selection lever 39 of the vehicle.

The description so far applies equally to the examples shown in FIGURES 1, 2 and 4. Reference is now directed particularly to FIGURE 1. The overload sensing means is here operative on the speed governor of the engine. The speed governor comprises a venturi tube 41, in the inlet manifold to the engine 1, connected by pipe 42 to a capsule 43 at one end of which is located a spring-loaded diaphragm 44. The diaphragm 44 co-operates with the fuel bar 45 of the fuel injection pump 46 of the engine 1. The reduction in pressure at the venturi 41 will be proportional to engine speed and thus it will be clear that the diaphragm 44 will move in accordance with engine speed. As load is applied to the engine it is arranged that the diaphragm will move the fuel bar 45 to the left to increase fuel delivery to the engine and vice versa. The opposite end of the fuel bar is adapted for co-operation with a control valve unit 47 comprising a cylinder 48 in which a spool valve 49 is slidable. The waisted part of the spool valve is in permanent connection with a port 51 and this port is connected to either of ports 52 or 53 which are connected respectively to a hydraulic pressure source and to reservoir. The valve is normally held by spring 54 in the position where port 51 is connected to port 53, but on occurrence of loading of the engine to an extent that a maximum fuel injection is called for, fuel bar 45 contacts the spool valve 49 to urge it into the cylinder 48 and to connect the port 51 to the port 52. Mounted on the speed control lever 39, is a jack cylinder 55, in which a piston 56 is slidably mounted. A piston rod 57, extends from piston 56 through the end of cylinder 55 adjacent to the fulcrum 58 of the speed controlling lever 39. The upper side of the piston 56 from which piston rod 57 extends has a comparatively small effective area whilst the lower side of the piston 56 has a full effective area. Flexible pipes 59 and 61, connect respectively to the upper and lower end of the cylinder 55. The pipe 59 is in direct connection with hydraulic pressure source which will always tend to urge the piston to its lowermost position. The pipe 61 is in connection with the port 51 of valve 47, and is fed from the hydraulic pressure source through a restrictor 62. Thus the pressure existing at the lower end of cylinder 55 will either be at pressure of the source or at drain pressure, depending on whether the spool valve 49 connects spool 51 to spool 52 or to the port 53. The piston rod 57 externally of the cylinder 55 is pivotally connected to the link 38 which, in this instance, is arranged to be comparatively long so that movement of the piston 56 will not greatly alter the angular position on link 38.

As so far described steering of the vehicle is obtained by adjustment of the position of the slotted lever 27, about its fulcrum 28, by adjustment of the steering wheel 33. As the lever 39 is moved to adjust vehicle speed, the pivot 25 is moved along the inclined slot 26, so that for any position of the pin 25, a given proportion exists between the displacement given to the rods 14 and 15, which, in turn, will determine the path of movement of the vehicle. This ratio will apply both for forward and reverse movement, i.e. when the pivot pin 25 is moved to one side or the other of the fulcrum axis 28. It is arranged that, when the pivot pin 25 corresponds with the fulcrum axis 28, zero displacements of the two pumps 5 and 6 are selected, and that the lever 39 is in a mid position. Under any particular circumstances of use, if the mechanical load exerted on the engine through the variable displacement pumps causes reduction in speed to the extent that the injection pump is moved by the governor diaphragm 44 to full fuel injection, the fuel bar 45 will contact spool valve 49 to depress it and to disconnect port 51 from the port 53 and connect it to the port 52. Whilst port 51 is connected to port 53, the pressure on the underside of piston 56 is at reservoir pressure and the high pressure then applied above the piston will urge it to the lowermost part of its movement, thus giving the most effective stroke to the control lever 39. Immediately the overload occurs and port 51 is connected to port 52, the pressure under piston 56 is raised to the pressure of the hydraulic source and since the underside of the piston is of larger area it will move upwardly, thus reducing the selected movement given to the link 38, and thus drawing the pivot pin 25 nearer to the central position in the slot 26. Such movement will continue until the overload is partially removed and a position of balance will occur where the spool valve 49 partially opens both ports 52 and 53 so that the pressure operative at port 51 is midway between these two pressures and the piston 56 attains a position of balance where the movement imparted to the link 38 is reduced from its original value but not reduced entirely to zero. In this way the vehicle will continue to move and the proportions of the selected displacement of the rods 14 and 15 relative to one another will remain the same. Thus, the vehicle will continue to move along the same path but at a slower speed.

Reference is now made to FIGURE 2 of the accompanying drawings. The arrangement of the engine pumps 5 and 6, motors 7 and 8, and linkage for adjusting pump displacement is the same as previously described. Also the steering control 33, operates in the same way as previously described. For speed control of the vehicle pump displacements are varied similarly by means of the lever 39, which acts on the link 38 through a pre-loaded caged spring 65. Overloading within the transmissions is detected by a pressure sensing device 66. In order to ensure that the valve 66 responds only to the higher pressure in the two transmissions, the two pipelines 9 and 12, of the two transmissions which are under pressure in forward motion of the vehicle, are connected by pipes 67 and 68 to a shuttle valve 69, having a movable valve member 71 which moves under the influence of the pressure difference between the two pipelines to close the pipeline at lower pressure and connect the other pipeline to an outlet pipe 72, leading to the unit 66. In a similar way the two pipelines, 11 and 13, of the transmissions which are under pressure during reverse motion, are connected by pipes 73 and 74 to a shuttle valve 75, having a valve member 76, which acts to connect the pipeline at higher pressure to an outlet pipe 77, which also leads to the unit 66. Within the unit 66 the two pipelines 72 and 77 are connected to cylinders 78 and 79 of small diameter within which pistons 81 and 82 are slidably mounted. The two pistons extend from the lower end of the cylinder and act against a hollow plunger 83, which encloses an adjustably loaded spring 84. The loading in spring 84 is adjusted by a cam follower 85, which acts in conjunction with a cam 86 secured to the link 38. Movement of the link 38 for displacement adjustment will move the cam 86 and will reduce the loading applied to the spring 84 with increase in selected forward or reverse speed. The loading applied to spring 84 is at a maximum in the neutral position. A pair of ports 87 and 88, open from the cylinders 78 and 79, and are connected by means of pipes 89 and 91, respectively, to a pair of single acting hydraulic jacks, 92 and 93. These jacks are oppositely opposed and have piston rods for co-operation with abutments 94 and 95, mounted one on each end of the cam 86. When hydraulic pressure is supplied to a jack 92 or 93, it engages its associated abutment 94 or 95 and can move to the extent only to reduce the selected displacement movement applied to the rod 38, to a zero displacement position, but no further. The pipes 89 and 91 are also connected by restrictors, respectively 96 and 97 to reservoir.

In operation, if the vehicle is travelling along a curved path the slotted lever 27 will have an appropriate inclination as determined by the adjustment of the steering wheel 33, and the speed control lever 39 will have been moved to an appropriate position to cause movement of the pivot pin 25 along the slot 26 from the central position. Assuming that the vehicle is travelling forwardly, the pipelines 9 and 12 will be under pressure and the valve member 71 will move to the position to connect the higher pressure to act on the piston 81. The other two pipelines, 11 and 13, will remain at a low boost pressure and the resulting pressure applied to the piston 82 will be a negligibly low value. If one of the transmissions reaches a dangerously high pressure this pressure will cause depression of the piston 81 against the loading of spring 84 to the extent that some pressure liquid passes into port 87 and causes the jack 92 to extend to engage the abutment 94 and to reduce the selected displacement given to the cam 86, by movement of the control lever 39, the spring 65 being compressed by this movement if there is some resistance to the movement of lever 39 to a smaller displacement position. This displacement reducing action will also act on the pivot pin to move it closer to the centre of the slot 26, and thus to reduce the displacement given to the two rods 14 and 15, whilst maintaining substantially the actual ratio of their displacements from the neutral position. In this way, the curvature of the path of travel is retained but the actual speed of movement of the vehicle is reduced, the amount of reduction being such as just to remove the overload from the particular transmission. In negotiating a curve either of the transmissions may become overloaded. During reverse movement of the vehicle the pressure will be in the pipes 11 and 13 and thus the cylinder 79, will be fed with the higher pressure and, if necessary will operate to cause displacement reducing action to take place by means of the jack 93.

The examples of FIGURES 1 and 2 both require the use of a steering regulator in the form of a steering wheel 33 and a speed regulator in the form of a control lever 39. There are some vehicles such for example as crawler tractors in which it is conventional for speed control and steering control to be effected by means of two levers which in the past have operated individually on the tracks of the tractor. In the conventional tractor with mechanical transmissions the operation of the lever has been merely to declutch and brake its associated track. Where on a trawler tractor individual hydrostatic transmissions are provided extending from the engine 1 to each track many drivers prefer to use the conventional two lever control. Such a control apart from responding in the same manner as conventional controls, can also be arranged to have an added advantage in that by arranging for each lever to control the speed ratio of its associated transmission it is possible for these levers to effect forward and reverse speed control in addition to forward and reverse steering. In applying the present invention to a conventional two lever control of a crawler tractor having individual hydrostatic transmissions to its tracks the intention is to provide a safety mechanism which when in operation to prevent overloading either of the engine or the transmissions can only operate to reduce speed of the vehicle and cannot operate to cause any substantial alteration of the selected steering path of the vehicle. A two lever control embodying the present invention is illustrated in FIGURE 4. It is assumed that the control as illustrated is applied to the engine 1 and hydrostatic transmissions 5, 7 and 6, 8 shown in FIGURES 1 and 2 and for this purpose the links 16 and 17 operated by bell crank levers 18 and 19 act to control displacement of the pumps 5 and 6 as in FIGURES 1 and 2. The two control levers are shown at 101 and 102 respectively. Each lever is in the form of a bell crank pivoted to the vehicle at fixed pivots 103 and 104. The cranked portions 105 and 106 of these levers include pivotal connections 107 and 108 to a pair of inclined links 109 and 110. These inclined links are pivotally connected together by a pin 112 which is slidably mounted in the slot 113 of a pivoted lever 114. The lever 114 is itself pivotally mounted by a pivot (not shown) secured by anchor 115 to a fixed point on the tractor. The pivot of lever 114 is similar to the pivot 28 for lever 27 in FIGURE 3. The lever 114 at one end includes a pivotal connection 116 for a link 117 which extends to a lever 118 for connection thereto by a pivot 119. The lever 118 is a slotted lever corresponding to the lever 27 in FIGURE 3 for co-operation in the links 23, 24, bell crank levers 18 and 19, and displacement control links 16 and 17 of the two hydrostatic pumps. In fact the arrangement of these elements is the same as previously described for FIGURES 1 and 2. The only difference lies in the lever 118 which is now extended in a different direction for connection to the link 117. The purpose of the link 117 is to ensure that the slotted levers 114 and 118 move angularly together and that the angular deflections are always similar.

The pivot pin 112 is slidable along the slot 113 of lever 114 and in addition to the links 109 and 111 this pivot is connected to the end of a lever 121. Lever 121 is centrally pivoted at a fixed pivot 122 of the tractor. At its opposite end lever 121 has a pivot pin 123 from which a long link 124 extends. At its opposite end the link 124 is pivotally connected at 125 to the end of lever 126, which in turn is pivotally connected at a fixed pivot 127 again secured to the tractor. At its opposite end lever 126 carries a cylinder 128 within which a piston 129 is slidably mounted. From the piston a piston rod 131 extends towards the central pivot 127. At its inner end the piston rod includes a pivotal connection 132 from which extends a long link 133 whose opposite end is secured to the pivot pin 25 operating in the slot 26 of slotted lever 118. Hydraulic connections 134 and 135 extend from the cylinder 128 and liquid at pressure is fed to these connections in the manner in which pressure liquid is fed through connections 59 and 61 to the cylinder 55 of FIGURE 1 so that piston 129 is moved the pivot 127 on occurrence of engine overload.

In normal operation the driver of the crawler tractor will control the tractor by simultaneous adjustments given to the control levers 101 and 102. For example in order to travel forwardly both levers will be given similar forward displacements whilst in order to travel in reverse both levers will be given similar reverse displacements. Assuming that both levers are moved similarly it will be seen that the pivot pin 112 is moved along slot 113 of lever 114 without causing pivotal movement of lever 114 about pivot 115, but, however, causing pivotal movement of lever 121 about its pivot 122. This movement of lever 121 will be transmitted through link 124 to the lever 126 and through link 133 to the pivot 25 where it will cause similar displacement movement to be given eventually to the displacement controls 16 and 17 of the hydrostatic pumps 5 and 6. The dimensions of the various bell crank lever links and levers are such that movement of the pivot pin 25 along slot 26 is substantially the same as the movement of pivot pin 112 along slot 113. In the event that the driver wishes to steer on a curved path he will move one of the control levers differently from the other control lever so as to select a slower speed for one track than for the other. Such different movement of the levers 101 and 102 will cause an angular movement of lever 114 about its pivot 115 and a linear movement of the pin 112 along slot 113. The pivot pin 25 which controls the relative displacements of the hydrostatic pumps will thus receive two movements, one of which is due to the angular movement of the lever 118 and the other of which is due to movement of the link 133 which latter movement results from linear movement of the pivotal pin 112. In this way it will be seen that under normal circumstances the pivot pin 25 will move substantially similarly to the pivot pin 112 and that individual pump displacements are effectively adjusted by the respective levers 101 and 102, i.e. the lever 101 will control the displacement of pump 5 through the displacement control link 16 and the lever 102 will control the displacement of the pump 6 through displacement control links 17. It will be seen that the link 117 which controls the angular disposition of lever 118 controls the proportion between the selected displacements of the two transmission pumps and in effect forms the steering regulator for the vehicle. Also it will be seen that the link 133 effectively forms the speed regulator for the vehicle since its movement causes similar displacements of the transmission pumps.

In the event of the engine 1 becoming overloaded hydraulic pressure will be supplied through the connection 134 in the same way that it is supplied to the connection 61 of FIGURE 1. Such movement will cause the piston rod 131 to move towards the fixed pivot 127 of lever 126 and thus to reduce any displacement along the slot 26 given to the pivot 25 as a result of the angular movement of lever 126. It is here emphasised that the links 124 and 133 are of considerable length to ensure that as a result of movement of piston 129 there is no substantial alteration in the angular inclination of the link 133. This will ensure that displacement along slot 26 given to the pivot pin 25 is in proportion to the distance of the pivot point 132 from the fixed pivot 127. It will thus be seen that on overloading of the engine and movement of the piston 129 that the speed movement as given to the link 133 by lever 126 will be reduced and that such movement will bring the pivot pin 25 nearer to the co-axial relationship with the fixed pivot 28 of lever 118. Such displacement reducing movement will carry the pin 25 along slot 26 at the angular inclination held by the lever 118 which of course agrees with the inclination of lever 114. The proportion between selected displacements will thus be retained and the curved path of travel of the crawler tractor will remain the same although of course its speed will reduce.

It is appreciated that the control levers 101 and 102 as illustrated could not be located to project upwardly from a horizontal pivot axis on the tractor in a more conventional manner. However, upwardly projecting levers may easily be adapted to co-operate with the bell crank levers 101 and 102.

Whilst the example of FIGURE 4 has been specifically described for operation following an overload of the engine driving the transmissions it will be appreciated that it is possible by simple modifications to the cylinder 128 and its connections to arrange that it should respond to excessive pressures in either transmission substantially in the manner shown in FIGURE 2 but at the same time retaining what is apparently individual control levers 101 and 102 operative on the displacement of transmission pumps 5 and 6.

The hydrostatic transmissions referred to in the described examples will require that suitable provisions are made for priming but such arrangements which involve the use of a priming pump are well known and outside the scope of the present invention. For complete overload protection of the vehicle having a transmission system of the kind referred to it is desirable that overload sensing means should be provided both for the engine and for the two transmissions and should both be capable of acting in the prevention of overload in the engine or transmission. A joint system may be provided if the valve 47 of FIGURE 1 operated by the engine governor were to feed pressure liquid on operation through non-return valves both to the jacks 92 and 93 of the arrangement shown in FIGURE 2. In this way the displacement would be reduced and load on the engine reduced in the event of engine overload occurring, and whatever the overload the selected ratio between the transmission speed ratios will be determined by the inclination of the slotted lever 27 and thus the curved path of travel of the vehicle as indicated by the steering wheel 33 will remain independent of the action of any overload prevention device.

I claim as my invention:

1. In combination, a vehicle having two ground engaging elements spaced transversely thereof, vehicle propulsion means comprising an engine and a pair of infinitely variable speed ratio power transmissions connecting the engine to the ground engaging elements to drive the vehicle, a transmission control connected to the transmissions to vary the speed ratios thereof, a speed control connected to the transmission control to select speed ratios for the transmissions, a steering control connected to the transmission control to establish a given proportionality between the speed ratios selected by the speed control, and an overload control connected to the transmission control to reduce the speed ratios of the transmissions commensurate with the proportionality established between them, in response to an overload condition in the propulsion means, there being overrider means in the connection between the speed control and the transmission control permitting the latter control to move independently of the speed control when such overload condition arises.

2. The combination according to claim 1 wherein the transmissions are hydraulically operated and the overload control is responsive to an increase in the hydrostatic pressure of one of the transmissions above a given value.

3. The combination according to claim 1 wherein the connections between each of the speed and overload controls, and the transmission control, include a common link, and the speed control is connected with the link by the overrider means.

4. The combination according to claim 3 wherein the overrider means includes a caged spring unit.

5. The combination according to claim 3 wherein the overrider means includes a piston which is slidably engaged in the speed control.

6. The combination according to claim 5 wherein the overload control includes a hydraulic system for operating the piston, a control valve in such system, and sensing means which are responsive to the overload condition to operate the control valve.

7. The combination according to claim 6 wherein the sensing means are responsive to a decrease in the speed of the engine below a given value.

8. The combination according to claim 1 wherein the transmission control includes a pair of speed ratio controls on the transmissions, a translationally mounted pin, and a pair of links which pivotally interconnect the pin with the speed ratio controls.

9. The combination according to claim 8 wherein the pin is slidably engaged in the steering control.

References Cited by the Examiner
UNITED STATES PATENTS

| | | | |
|---|---|---|---|
| 2,774,434 | 12/56 | Ferris | 180—6.48 X |
| 2,941,609 | 6/60 | Bowers et al. | 180—6.48 |
| 2,942,421 | 6/60 | Hann et al. | 60—19 |
| 3,003,309 | 10/61 | Bowers et al. | 60—53 X |
| 3,025,673 | 3/62 | Brown et al. | 180—6.48 |

PHILIP ARNOLD, *Primary Examiner.*

BENJAMIN HERSH, A. HARRY LEVY, *Examiners.*